US009631956B2

(12) United States Patent
Mihelich et al.

(10) Patent No.: US 9,631,956 B2
(45) Date of Patent: Apr. 25, 2017

(54) METHODS AND SYSTEMS FOR CALIBRATING SENSORS OF A COMPUTING DEVICE

(71) Applicant: Google Technology Holdings LLC, Mountain View, CA (US)

(72) Inventors: Patrick Mihelich, Sunnyvale, CA (US); Renzo De Nardi, Sunnyvale, CA (US); Ivan Dryanovski, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 688 days.

(21) Appl. No.: 14/147,278

(22) Filed: Jan. 3, 2014

(65) Prior Publication Data

US 2015/0192439 A1    Jul. 9, 2015

(51) Int. Cl.
```
G01P 15/08    (2006.01)
G01D 18/00    (2006.01)
G01P 21/00    (2006.01)
G01C 25/00    (2006.01)
H04N 17/00    (2006.01)
```
(52) U.S. Cl.
CPC ............ *G01D 18/00* (2013.01); *G01C 25/00* (2013.01); *G01P 21/00* (2013.01); *H04N 17/002* (2013.01)

(58) Field of Classification Search
USPC ............................................ 702/92, 99, 141
See application file for complete search history.

(56) References Cited

U.S. PATENT DOCUMENTS

| | | | |
|---|---|---|---|
| 8,626,465 B2 * | 1/2014 | Moore | G01K 7/42 702/141 |
| 2010/0088061 A1 * | 4/2010 | Horodezky | G06F 1/1624 702/141 |
| 2012/0215477 A1 * | 8/2012 | Tuck | G01P 21/00 702/99 |

* cited by examiner

*Primary Examiner* — Lam Nguyen

(57) ABSTRACT

Methods and systems for calibrating sensors on a computing device are described herein. In an example implementation, a computing device may perform a method to calibrate one or more sensors, which may include receiving an indication that a sensor has been calibrated. The computing device may further receive independent observations of a motion of a device from the calibrated sensor and a potentially non-calibrated sensor. The device may determine as independent estimation of motion based on the movement of the device corresponding to the outputs of the respective sensors. Based on whether or not the estimation of motion as provided by the potentially non-calibrated sensor is within a threshold variance of the estimation of motion as provided by the calibrated sensor, the computing device may provide instructions to adjust parameters of the non-calibrated sensor.

20 Claims, 6 Drawing Sheets

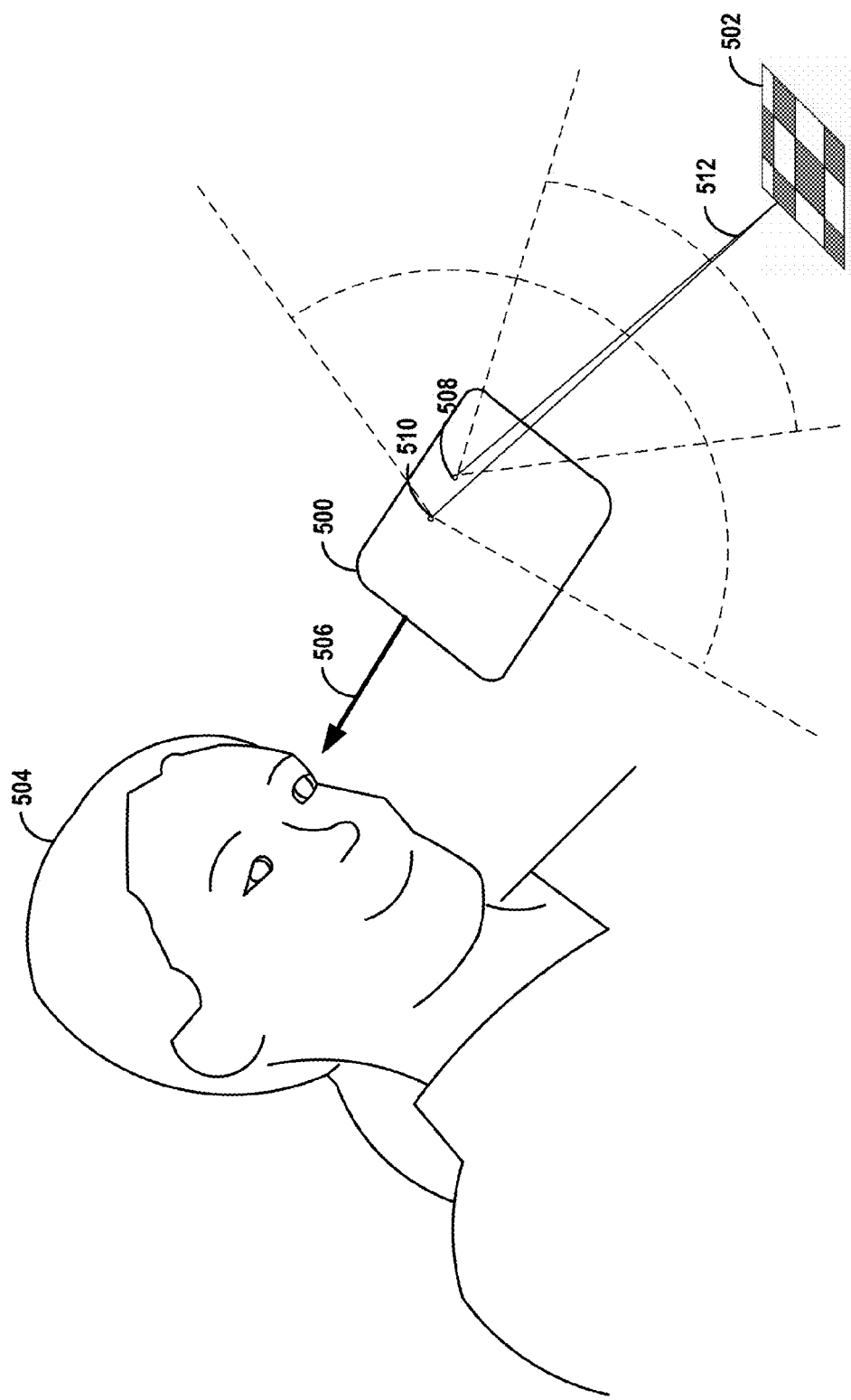

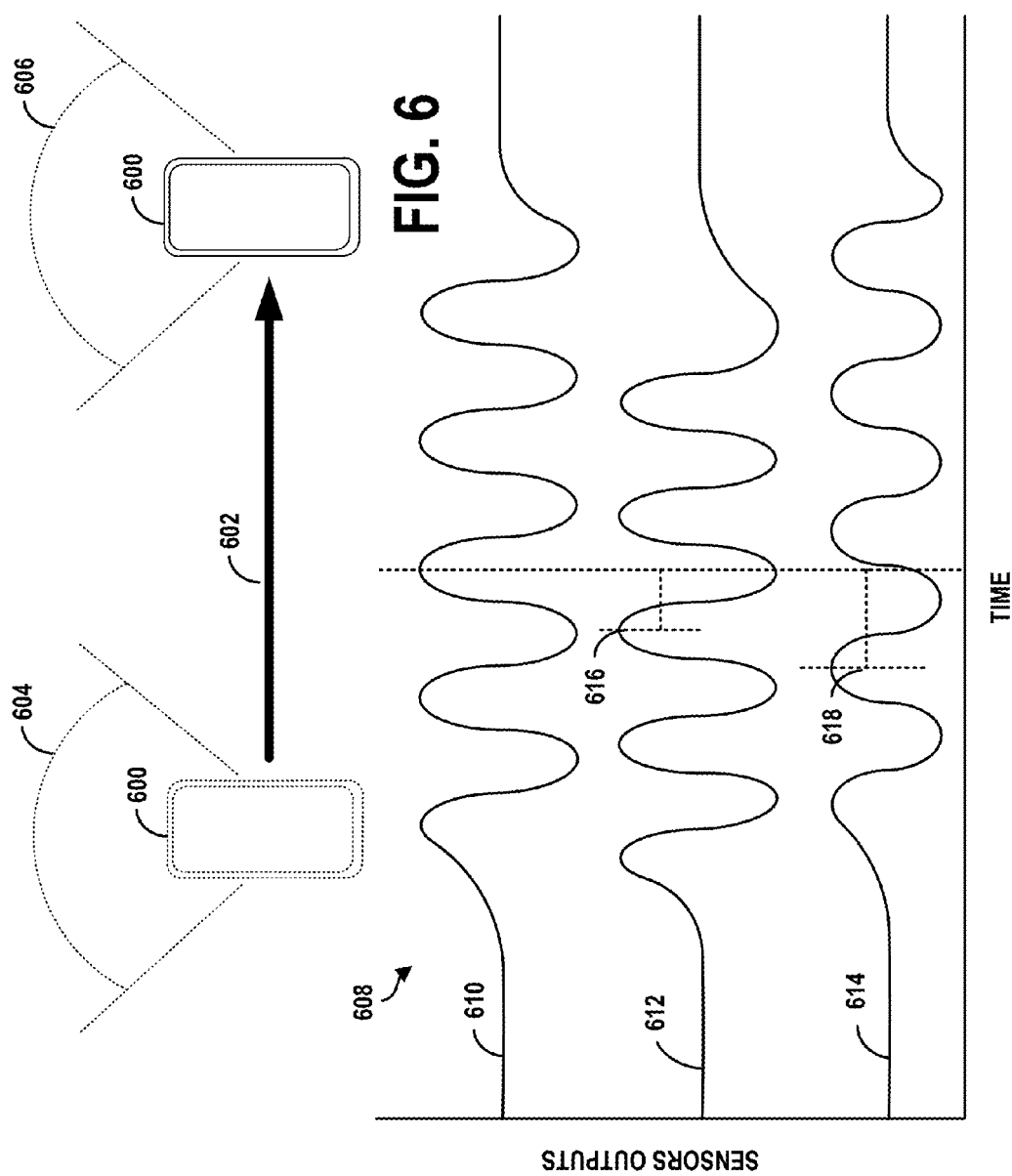

METHODS AND SYSTEMS FOR CALIBRATING SENSORS OF A COMPUTING DEVICE

BACKGROUND

Unless otherwise indicated herein, the materials described in this section are not prior art to the claims in this application and are not admitted to be prior art by inclusion in this section.

A computing device may receive information from various sensors configured to operate for the computing device. The sensors may be coupled to the device at different points. In addition, the computing device's software may be configured to use information provided by sensors. Different types of sensors may capture a variety of information for the computing device. A camera associated with a computing device may capture images, for example. In addition, a computing device may also include sensors that measure the motion of the device. Likewise, sensors may measure the amount of power received by the computing device's battery. A computing device may be configured to receive information from multiple types of sensors for analysis and use.

SUMMARY

The present application discloses embodiments that relate to methods and systems for calibrating sensors of a computing device.

In one aspect, an example method is described, which may be performed by a device configured with a plurality of sensors. The method may include receiving information indicating that a first sensor of the plurality of sensors has been calibrated. The method may also include receiving from the first sensor and a second sensor of the plurality of sensors outputs indicative of independent observations of a motion of the device. The method may further include determining a first estimation of the motion of the device based on the output of the first sensor and a second estimation of the motion of the device based on the output of the second sensor. The method may additionally include determining whether the second estimation of motion of the device is within a threshold variance of the first estimation of motion of the device and based on whether the second estimation of motion of the device is within the threshold variance of the first estimation of motion of the device, providing instructions to adjust one or more parameters of the second sensor.

In another aspect, a non-transitory computer readable storage medium having stored therein instructions, that when executed by a computing device, cause the computing device to perform functions. The functions may include receiving information indicating that a first sensor of a plurality of sensors of a computing device has been calibrated and receiving from the first sensor and a second sensor of the plurality of sensors outputs indicative of independent observations of a motion of the computing device. The functions may also include determining a first estimation of the motion of the computing device based on the output of the first sensor and a second estimation of the motion of the computing device based on the output of the second sensor. The functions may further include determining whether the second estimation of motion of the computing device is within a threshold variance of the first estimation of motion of the computing device and based on whether the second estimation of motion of the computing device is within the threshold variance of the first estimation of motion of the computing device, providing instructions to adjust one or more parameters of the second sensor.

In a further aspect, a system is provided that comprises at least one processor, a plurality of sensors, and a memory having stored thereon instructions that, upon execution by the at least one processor, cause the system to perform functions. The functions may include receiving information indicating that a first sensor of a plurality of sensors of a computing device has been calibrated and receiving from the first sensor and a second sensor of the plurality of sensors outputs indicative of independent observations of a motion of the computing device. The functions may also include determining a first estimation of the motion of the computing device based on the output of the first sensor and a second estimation of the motion of the computing device based on the output of the second sensor. The functions may further include determining whether the second estimation of motion of the computing device is within a threshold variance of the first estimation of motion of the computing device and based on whether the second estimation of motion of the computing device is within the threshold variance of the first estimation of motion of the computing device, providing instructions to adjust one or more parameters of the second sensor.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a conceptual illustration of an example computing device calibrating sensors.

FIG. 6 is another conceptual illustration of an example computing device calibrating sensors.

DETAILED DESCRIPTION

Figure 1:
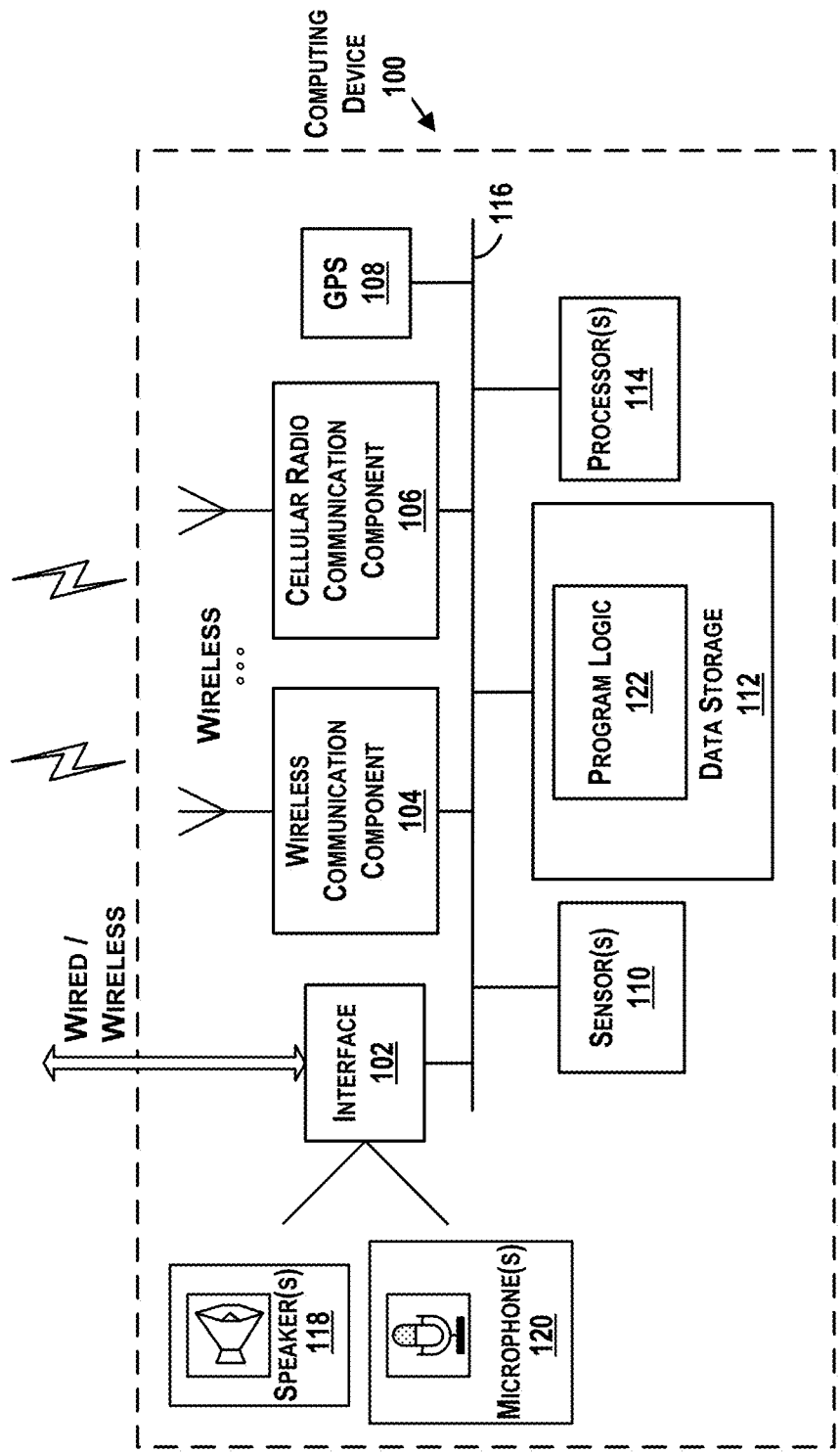
FIG. 1 is a functional block diagram depicting an example computing device.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a computing device, such as a mobile phone or tablet computing device, may include different types of sensors configured to capture a variety of information. The different types of sensors associated with the computing device may be configured to capture information corresponding to the environment, information relating to the computing device, and/or motions based on the computing device, for example. For example, the computing device may receive updates about the positioning of the device from a global positioning system (GPS) and may receive an indication when the computing device may be in motion from an inertial measurement unit (IMU). In addition, the sensors may provide the information to the computing device continuously in real time and/or in another acquisition format.

During operation, the computing device may receive the information acquired by one or multiple sensors and may analyze the information in order to perform various functions and/or processes. For example, the computing device may use data captured by device sensors to determine the location of the device and/or perform object or environment recognition. The computing device may combine information provided by different types of sensors to assist in executing functions requested by a user or software of the computing device, for example.

However, sometimes one or more of the respective sensors of an example computing device may require adjustments in order to continue providing accurate information. For example, a respective sensor may require adjustments to one or more of its parameters as a result of normal use or after experiencing a physical disruption (e.g., the computing device was dropped by a user). The respective sensors of the computing device may be configured in a manner that operating within certain parameters results in optimal performance of the particular sensor. For example, one or multiple cameras of the computing device may capture more focused images while operating within a certain range of parameter (e.g., focus and positioning). Optimal operating parameters may be determined during factory manufacturing of the computing device or during manual calibration tests, for example. Similarly, in another example, a sensor may require adjustments in order to align its outputs to provide information in accordance with the other sensors. For example, the computing device may depend on outputs of the IMU to properly match information acquired within images captured by the computing device's camera system. By extension, other reasons or situations may exist that may cause a sensor or multiple sensors associated with a computing device to require some form of calibration as well. In addition, different types of sensors may require calibration more often than others, which may be based on the quality of the particular sensor, the usage of the sensor, or other factors, for example.

In one example implementation for calibrating sensors of a computing device, the computing device may execute an example method, which may include receiving information that indicates that one sensor or multiple sensors of the computing device has been recently calibrated. In some instances, the computing device may receive an indication that a particular sensor has been calibrated within a recent predefined threshold period of time or some other requirement. In addition, the computing system may receive the indication from a component associated with the computing device, the sensor itself, or from another source (e.g., robotic device, user). For example, a computing device may determine based on received information that a camera associated with the computing device has been calibrated using an image-calibration process or another calibration that may have been executed by a user or during initial factory manufacturing.

After determining at least one of the sensors on the computing device has been calibrated, the computing device may use the calibrated sensor as a base for determining possible adjustments that other sensors may require. For example, the computing device may receive outputs from sensors captured based on a movement or motion in general of the computing device. The information within the outputs may be indicative of independent observations of the motion of the computing device and may be captured by any of the computing device's sensors, which may include the calibrated sensor and a different sensor, for example. Based on the received outputs, the computing device may determine multiple estimations of motion based on the movement of the computing device as captured by within the outputs of each of the respective sensors. In some instances, the computing device may use features in the local environment for observations, which may also assist the computing device in determining adjustments for sensors.

In addition, in order to determine if any potentially non-calibrated sensors may require some form adjustments to operate within the optimal operating range (e.g., adjusting parameters of the sensor), the computing device may compare the estimations of motion as captured by a potentially non-calibrated sensor with the calibrated sensor. Based on the comparisons and/or through other forms of analysis, the computing device may determine whether the estimation of motion from the potentially non-calibrated sensor is within a threshold variance of the estimation of motion as provided by the calibrated sensor. To further illustrate, the computing device may compare the sensors' outputs based on varying threshold variances within different examples.

Based on the results derived from the comparison, the computing device may determine whether to calibrate one or multiple parameters of the potentially non-calibrated sensor in order to cause the non-calibrated sensor to capture and provide accurate information to the computing device. For example, the computing device may adjust parameters of a sensor in order to produce results in-line with the outputs as provided by the calibrated sensor. The computing device may be configured to use information from multiple sensors and may require the sensors to be configured so that the outputs operate in a synchronous format.

In some instances, a computing device may calibrate multiple sensors simultaneously using a calibration process. For example, the computing device may calibrate all the sensors of the computing device based on known accuracy of the sensors (e.g., optimal operating parameter ranges) that may have been obtained or determined during factory manufacturing or user calibration.

Referring now to the figures, FIG. 1 illustrates an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, email/messaging device, tablet computer, or similar device that may be configured to perform the functions described herein. Generally, the computing device 100 may be any type of computing device or transmitter that is configured to transmit data or receive data in accordance with methods and functions described herein.

The computing device 100 may include an interface 102, a wireless communication component 104, a cellular radio communication component 106, a global position system (GPS) receiver 108, sensor(s) 110, data storage 112, and processor(s) 114. Components illustrated in FIG. 1 may be linked together by a communication link 116. The computing device 100 may also include hardware to enable communication within the computing device 100 and between the computing device 100 and other computing devices (not shown), such as a server entity. The hardware may include transmitters, receivers, and antennas, for example.

The interface 102 may be configured to allow the computing device 100 to communicate with other computing devices (not shown), such as a server. Thus, the interface 102 may be configured to receive input data from one or more computing devices, and may also be configured to send output data to the one or more computing devices. The interface 102 may be configured to function according to a wired or wireless communication protocol. In some examples, the interface 102 may include buttons, a keyboard, a touchscreen, speaker(s) 118, microphone(s) 120, and/or any other elements for receiving inputs, as well as one or more displays, and/or any other elements for communicating outputs.

The wireless communication component 104 may be a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may be a communication interface that is configured to facilitate wireless communication (voice and/or data) with a cellular wireless base station to provide mobile connectivity to a network. The cellular radio communication component 106 may be configured to connect to a base station of a cell in which the computing device 100 is located, for example.

The GPS receiver 108 may be configured to estimate a location of the computing device 100 by precisely timing signals sent by GPS satellites.

The sensor(s) 110 may include one or more sensors, or may represent one or more sensors included within the computing device 100. Example sensors include an accelerometer, gyroscope, pedometer, light sensors, microphone, camera(s), infrared flash, barometer, magnetometer, GPS, Wi-Fi, near field communication (NFC), Bluetooth, projector, depth sensor, temperature sensors, or other location and/or context-aware sensors.

The data storage 112 may store program logic 122 that can be accessed and executed by the processor(s) 114. The data storage 112 may also store data collected by the sensor(s) 110, or data collected by any of the wireless communication component 104, the cellular radio communication component 106, and the GPS receiver 108.

The processor(s) 114 may be configured to receive data collected by any of sensor(s) 110 and perform any number of functions based on the data. As an example, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100. In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
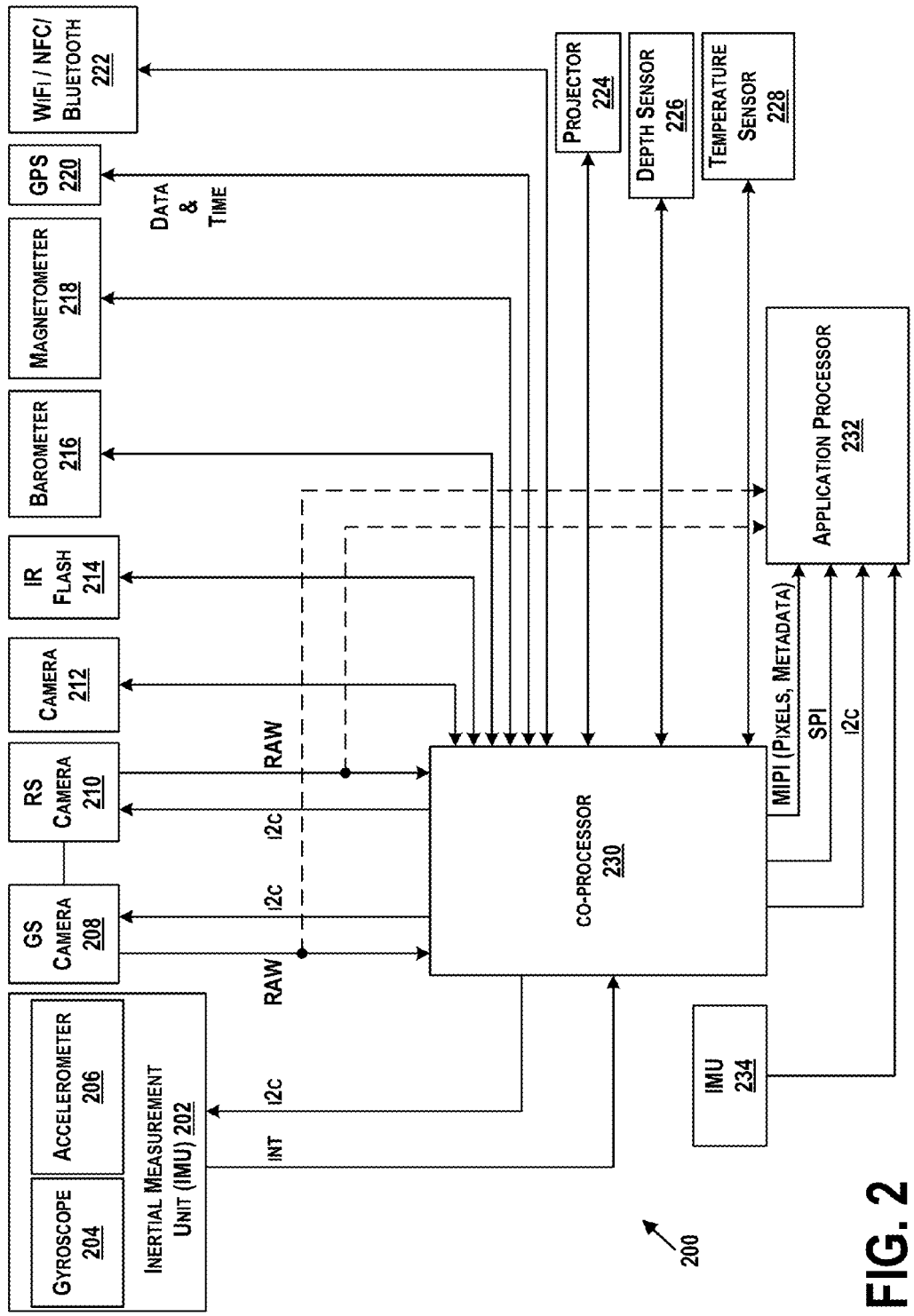
FIG. 2 illustrates another in accordance with an example embodiment.

FIG. 2 illustrates another example computing device 200. The computing device 200 in FIG. 2 may be representative of a portion of the computing device 100 shown in FIG. 1. In FIG. 2, the computing device 200 is shown to include a number of sensors such as an inertial measurement unit (IMU) 202 including a gyroscope 204 and an accelerometer 206, a global shutter (GS) camera 208, a rolling shutter (RS) camera 210, a front facing camera 212, an infrared (IR) flash 214, a barometer 216, a magnetometer 218, a GPS receiver 220, a WiFi/NFC/Bluetooth sensor 222, a projector 224, a depth sensor 226, and a temperature sensor 228, each of which outputs to a co-processor 230. The co-processor 230 receives input from and outputs to an application processor 232. The computing device 200 may further include a second IMU 234 that outputs directly to the application processor 232.

The IMU 202 may be configured to determine a velocity, orientation, and gravitational forces of the computing device 200 based on outputs of the gyroscope 204 and the accelerometer 206.

The GS camera 208 may be configured on the computing device 200 to be a rear facing camera, so as to face away from a front of the computing device 200. The GS camera 208 may be configured to read outputs of all pixels of the camera 208 simultaneously. The GS camera 208 may be configured to have about a 120-170 degree field of view, such as a fish eye sensor, for wide-angle viewing.

The RS camera 210 may be configured to read outputs of pixels from a top of the pixel display to a bottom of the pixel display. As one example, the RS camera 210 may be a red/green/blue (RGB) infrared (IR) 4 megapixel image sensor, although other sensors are possible as well. The RS camera 210 may have a fast exposure so as to operate with a minimum readout time of about 5.5 ms, for example. Like the GS camera 208, the RS camera 210 may be a rear facing camera.

The camera 212 may be an additional camera in the computing device 200 that is configured as a front facing camera, or in a direction facing opposite of the GS camera 208 and the RS camera 210. The camera 212 may be configured to capture images of a first viewpoint of the computing device 200 and the GS camera 208 and the RS camera 210 may be configured to capture images of a second viewpoint of the device that is opposite the first viewpoint. The camera 212 may be a wide angle camera, and may have about a 120-170 degree field of view for wide angle viewing, for example.

The IR flash 214 may provide a light source for the computing device 200, and may be configured to output light in a direction toward a rear of the computing device 200 so as to provide light for the GS camera 208 and RS camera 210, for example. In some examples, the IR flash 214 may be configured to flash at a low duty cycle, such as 5 Hz, or in a non-continuous manner as directed by the co-processor 230 or application processor 232. The IR flash 214 may include an LED light source configured for use in mobile devices, for example.

Figure 3A:
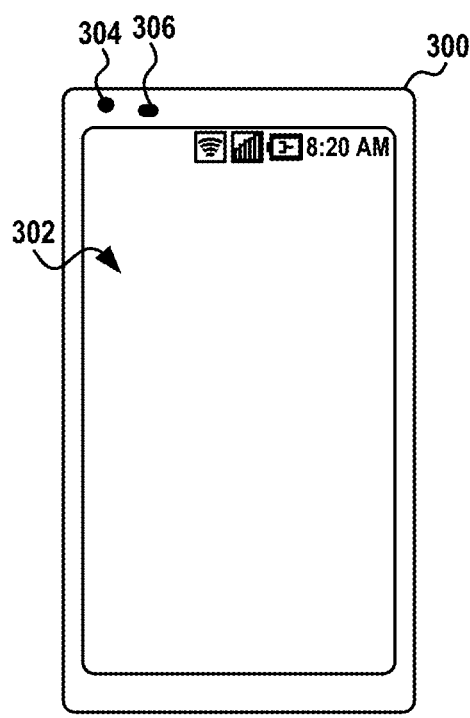
FIGS. 3A-3B illustrate an example computing device.
Figure 3B:
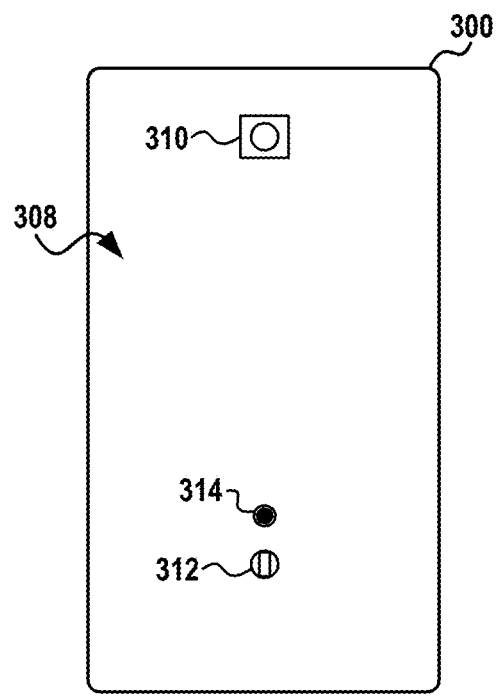

FIGS. 3A-3B are conceptual illustrations of a computing device 300 that show a configuration of some sensors of the computing device 200 in FIG. 2. In FIGS. 3A-3B, the computing device 300 is shown as a mobile phone. The computing device 300 may be similar to either of computing device 100 in FIG. 1 or computing device 200 in FIG. 2. FIG. 3A illustrates a front of the computing device 300 in which a display 302 is provided, along with a front facing camera 304, and a P/L sensor opening 306 (e.g., a proximity or light sensor). The front facing camera 304 may be the camera 212 as described in FIG. 2.

FIG. 3B illustrates a back 308 of the computing device 300 in which a rear camera 310 and another rear camera 314 are provided. The rear camera 310 may be the RS camera 210 and the rear camera 312 may be the GS camera 208, as described in the computing device 200 in FIG. 2. The back 308 of the computing device 300 also includes an IR-flash 314, which may be the IR flash 214 or the projector 224 as described in the computing device 200 in FIG. 2. In one example, the IR flash 214 and the projector 224 may be one in the same. For instance, a single IR flash may be used to perform the functions of the IR flash 214 and the projector 224. In another example, the computing device 300 may include a second flash (e.g., an LED flash) located near the rear camera 310 (not shown). A configuration and placement of the sensors may be helpful to provide desired functionality of the computing device 300, for example, however other configurations are possible as well.

Referring back to FIG. 2, the barometer 216 may include a pressure sensor, and may be configured to determine air pressures and altitude changes.

The magnetometer 218 may be configured to provide roll, yaw, and pitch measurements of the computing device 200, and can be configured to operate as an internal compass, for example. In some examples, the magnetometer 218 may be a component of the IMU 202 (not shown).

The GPS receiver 220 may be similar to the GPS receiver 108 described in the computing device 100 of FIG. 1. In further examples, the GPS 220 may also output timing signals as received from GPS satellites or other network entities. Such timing signals may be used to synchronize collected data from sensors across multiple devices that include the same satellite timestamps.

The WiFi/NFC/Bluetooth sensor 222 may include wireless communication components configured to operate according to WiFi and Bluetooth standards, as discussed above with the computing device 100 of FIG. 1, and according to NFC standards to establish wireless communication with another device via contact or coming into close proximity with the other device.

The projector 224 may be or include a structured light projector that has a laser with a pattern generator to produce a dot pattern in an environment. The projector 224 may be configured to operate in conjunction with the RS camera 210 to recover information regarding depth of objects in the environment, such as three-dimensional (3D) characteristics of the objects. For example, the separate depth sensor 226 may be configured to capture video data of the dot pattern in 3D under ambient light conditions to sense a range of objects in the environment. The projector 224 and/or depth sensor 226 may be configured to determine shapes of objects based on the projected dot pattern. By way of example, the depth sensor 226 may be configured to cause the projector 224 to produce a dot pattern and cause the RS camera 210 to capture an image of the dot pattern. The depth sensor 226 may then process the image of the dot pattern, use various algorithms to triangulate and extract 3D data, and output a depth image to the co-processor 230.

The temperature sensor 228 may be configured to measure a temperature or temperature gradient, such as a change in temperature, for example, of an ambient environment of the computing device 200.

The co-processor 230 may be configured to control all sensors on the computing device 200. In examples, the co-processor 230 may control exposure times of any of cameras 208, 210, and 212 to match the IR flash 214, control the projector 224 pulse sync, duration, and intensity, and in general, control data capture or collection times of the sensors. The co-processor 230 may also be configured to process data from any of the sensors into an appropriate format for the application processor 232. In some examples, the co-processor 230 merges all data from any of the sensors that corresponds to a same timestamp or data collection time (or time period) into a single data structure to be provided to the application processor 232.

The application processor 232 may be configured to control other functionality of the computing device 200, such as to control the computing device 200 to operate according to an operating system or any number of software applications stored on the computing device 200. The application processor 232 may use the data collected by the sensors and received from the co-processor to perform any number of types of functionality. The application processor 232 may receive outputs of the co-processor 230, and in some examples, the application processor 232 may receive raw data outputs from other sensors as well, including the GS camera 208 and the RS camera 210.

The second IMU 234 may output collected data directly to the application processor 232, which may be received by the application processor 232 and used to trigger other sensors to begin collecting data. As an example, outputs of the second IMU 234 may be indicative of motion of the computing device 200, and when the computing device 200 is in motion, it may be desired to collect image data, GPS data, etc. Thus, the application processor 232 can trigger other sensors through communication signaling on common buses to collect data at the times at which the outputs of the IMU 234 indicate motion.

The computing device 200 shown in FIG. 2 may include a number of communication buses between each of the sensors and processors. For example, the co-processor 230 may communicate with each of the IMU 202, the GS camera 208, and the RS camera 212 over an inter-integrated circuit (I2C) bus that includes a multi-master serial single-ended bus for communication. The co-processor 230 may receive raw data collected, measured, or detected by each of the IMU 202, the GS camera 208, and the RS camera 212 over the same I2C bus or a separate communication bus. The co-processor 230 may communicate with the application processor 232 over a number of communication buses including a serial peripheral interface (SPI) bus that includes a synchronous serial data link that may operate in full duplex mode, the I2C bus, and a mobile industry processor interface (MIPI) that includes a serial interface configured for communicating camera or pixel information. Use of various buses may be determined based on need of speed of communication of data as well as bandwidth provided by the respective communication bus, for example.

Figure 4:
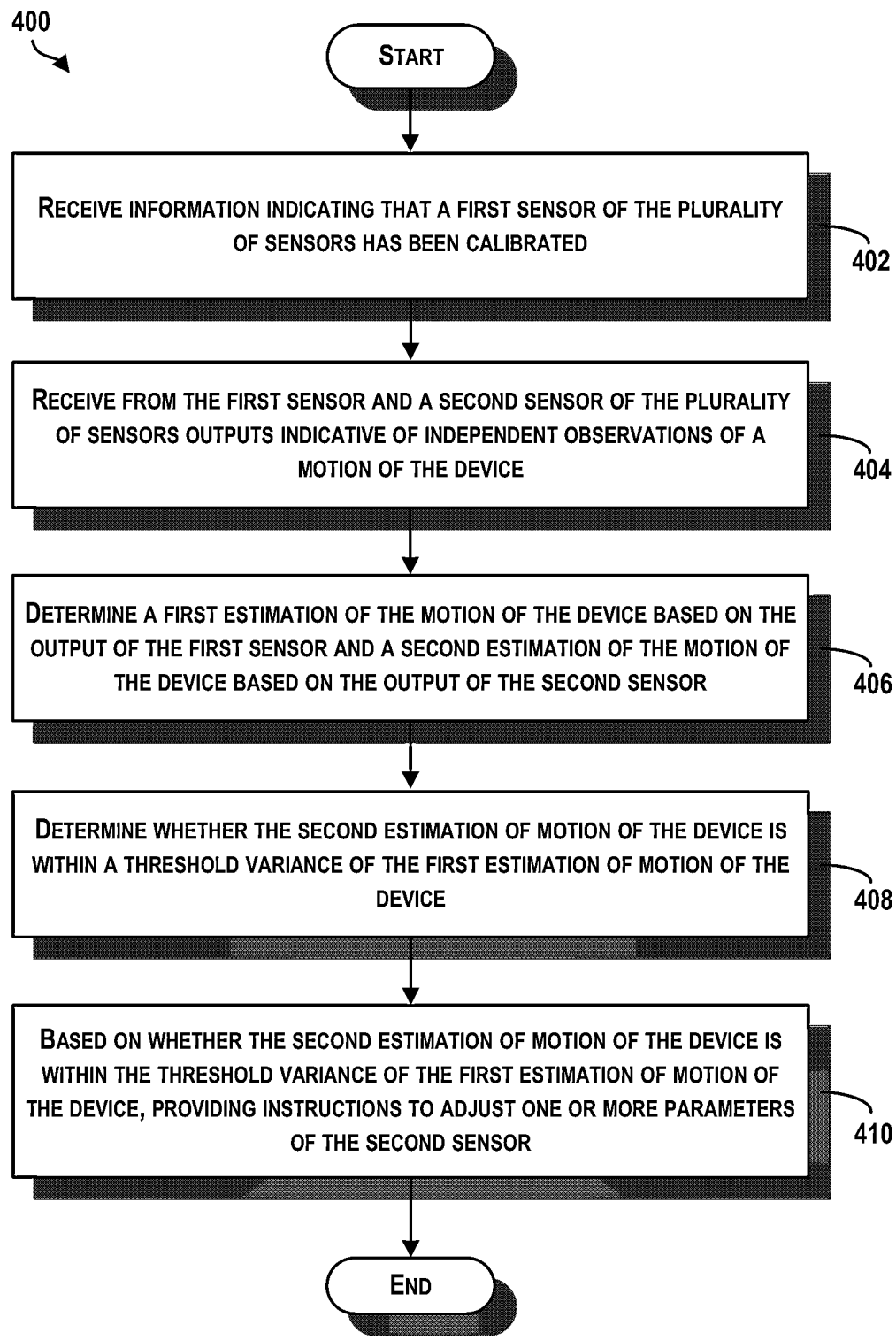
FIG. 4 is a flow chart of an example method for calibrating sensors of a computing device.

FIG. 4 is a flow chart of a method 400 for calibrating sensors of a computing device. The example method 400 shown in FIG. 4 serves as one example and other example methods for calibrating sensors of a computing device may exist as well.

The method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may be any other volatile or non-volatile storage systems. The computer readable medium may be considered a computer readable storage medium, a tangible storage device, or other article of manufacture, for example.

Furthermore, for the method 400 and other processes and methods disclosed herein, each block in FIG. 4 may represent circuitry that is wired to perform the specific logical functions in the process.

At block 402, the method 400 may include receiving information indicating that a first sensor of the plurality of sensors has been calibrated. In particular, a computing device with one or more sensors may receive an indication that at least one sensor has been calibrated, for example. Likewise, in some instances, the computing device may receive an indication that multiple sensors of the computing device may have been calibrated and/or may receive an indication or signal that various components of a sensor may have been calibrated, for example. In addition, the computing device may receive information regarding the parameters of a sensor that have been calibrated. For example, the computing device may receive information relating to the parameters operating within an optimal range for a particular sensor. A computing device may receive other indications or signals indicating the calibration of the computing device or sensors of the device as well.

In addition, within some example implementations, different types of computing devices may be configured to perform the method 400, such as the example devices illustrated within FIGS. 1-2 and FIGS. 3A-3B. For example, a mobile phone, wearable computing device, tablet computer, and/or other types of devices may be configured to execute the method 400 or similar methods. Furthermore, as previously indicated, example computing devices may also include a wide array of sensors configured to capture information for the computing device to use. Examples of possible sensors that may be associated with a computing device include a gyroscope, accelerometer, camera, barometer, magnetometer, global positioning system (GPS), Wi-Fi sensor, near-field communication (NFC) sensor, and Bluetooth sensor, etc. Furthermore, a computing device may also include other types of sensors.

Within example implementations, the different types of sensors associated with a device may capture a variety of information, which may include data corresponding to the computing device (e.g., movement of the device) and/or data corresponding to the surrounding environment of the computing device, for example. In a particular example, a camera system of a computing device may capture images of the environment, which may include obtaining images that capture depth information corresponding to objects within the environment of the computing device. The camera system may include multiple cameras, such as a normal imaging camera and/or a machine vision camera. During operation, the camera system may be configured to provide the information at a fast acquisition rate to the computing device for processing and analysis. The computing device may include an IR flash to assist the camera system during operation.

Likewise, as previously discussed in FIGS. 1-2 and FIGS. 3A-3B, an example computing device may include an IMU unit that may capture measurements of the computing device's movements. The IMU unit may include different sensors (e.g., gyroscope, accelerometer, pedometer, etc.) configured to capture motions made by the device, for example. For example, the IMU unit may provide information to the processor or multiple processors of the computing device that indicates if the computing device may be in motion.

In another example, the computing device may receive location information from a GPS receiver, which may enable to the computing device to determine its location according to global coordinates. The computing device may also receive information from other devices via wireless or wired communication, which may include using a Wi-Fi sensor, a near-field communication (NFC) sensor and/or a Bluetooth sensor, for example. In addition, the computing device may include various sensors dedicated to capturing other types of information. Example sensors may be configured to capture different types of information depending on the configuration of the computing device as well.

While the computing device operates, sensors associated with a computing device may require adjustments (e.g., calibration) periodically in order to continue to capture accurate information. Within examples, various reasons may cause a sensor or multiple sensors of a computing device to require adjustments periodically. For example, one or more parameters of a sensor may require some form of calibration as a result of normal use over time. The calibration may involve adjusting various parameters associated with the sensor. Likewise, a physical disruption (e.g., user dropping the computing device) may cause sensors to provide inaccurate information to the computing device and may require the computing device to calibrate the sensors. In such an example, a computing device may be configured to determine that the information received from a respective sensor is inaccurate.

In another example implementation, a sensor may require adjustments to align its outputs with the outputs of other sensors (e.g., a single sensor or multiple sensors) on the computing device. The computing device may receive outputs from multiple sensors and require the outputs from all or a subset of the sensors to be accurate and synched based on each other, for example. In particular, components of the computing device (e.g., processors, device platform) may require the outputs of sensors to be synchronized to be timed properly. Likewise, in other examples, other reasons and/or causes may exist that require the computing device to perform some type of calibration on sensors.

In addition, the amount a sensor or multiple sensors may require adjustments may vary within examples. For example, a respective sensor may require minor adjustments and/or significant adjustments to one or multiple parameters based on the accuracy of its outputs. The degree a computing device may adjust parameters of a sensor may vary within different examples.

In yet another example implementation, a computing device and/or components of the computing device may be configured to determine whether a sensor or multiple sensors require some form of calibration (e.g., adjusting sensor parameters). For example, the computing device may use a performance-based test to analyze the outputs of respective sensors to determine if adjustments may be necessary. The performance-based test may analyze the outputs received from respective sensors in a variety of ways, such as determining the accuracy of a respective sensor compared to the information provided by other sensors based on the same period of analysis.

Likewise, the performance-based test may include the computing device utilizing past outputs captured by the respective sensor or multiple sensors to determine if variance exists in recently received outputs as a result of the sensor(s) requiring adjustments. In particular, the computing device may compare a set of outputs from one sensor to another set of outputs from a different sensor or multiple sensors. Within examples, a computing device determining if a sensor or multiple sensors may require adjustments may use comparisons between sensors of different types and/or sensors of the same type.

In addition, the computing device may further determine the specific parameters or environment features of a sensor that require some form of adjustment after determining that the sensor may need to be calibrated. The computing device may focus upon specific parameters or environment features, such as the position, orientation, and/or other components of a sensor or readings of the environment by the sensor in order to configure the sensor to provide accurate outputs.

In another example implementation, the computing device may receive information from another device that indicates a sensor or multiple sensors of the computing device have been calibrated. For example, a system or robotic device that constructs and/or handles the computing device may capture and provide information to the computing device indicating that at least one of the sensors has been calibrated. In such an example, the robotic device may execute a calibration process to calibrate a sensor or multiple sensors associated with a computing device and may set a signal for the computing device that indicates which, if any, of the sensors are calibrated.

In an example calibration process, a robotic device may move the computing device a predetermined amount using a motion technique (e.g., an arm of the robotic device moving the computing device a predetermined path). During the motion technique, the computing device may capture a number of observations of a particular point or indicative of the motion of the computing device in general, for example. At this point, the computing device may use the multiple observations corresponding to the motion of the computing device in addition to knowing the predetermined amount of motion to adjust a sensor or multiple sensors. In some instances, the computing device may not require motion readings, and motion may be part of the estimation, which may be used for calibration. The combination of receiving information relating to the predetermined path executed by the robotic arm and the multiple observations may enable the computing device to determine which parameters of a sensor capturing the observations may require adjustments.

Furthermore, the computing device may receive calibration information from the robotic device and/or system through wireless communication (e.g., a NFC sensor). For example, the robotic device may provide information regarding which specific parameters of the sensor to adjust and the amount or degree to execute the adjustments. Likewise, the computing device may receive an indication that at least one sensor has been calibrated from an entity within a network.

In another aspect, a computing device may receive an indication that a sensor or multiple sensors may have been calibrated based on input provided from another source and/or a user. For example, a source (e.g., another computing device) may connect (e.g., wired or wirelessly) to the computing device and indicate that one or multiple sensors of the computing device may not require calibration since the sensors provide accurate outputs.

Similarly, the computing device may receive information indicating that a sensor or multiple sensors have been calibrated directly from a user input. In that case, the computing device may have enabled the user to calibrate a sensor (e.g., camera) through various techniques, for example. For example, a computing device may be configured to provide means for a user to calibrate one or more sensors. In one example, the computing device may enable a user to calibrate a camera or multiple cameras within the camera system of the computing device using one or more adjustment techniques. In particular, a user may calibrate a camera of the device by capturing images of a specific pattern and calibrating the camera based on variance within the images. The computing device may calibrate various parameters associated with a camera or multiple cameras based on outputs captured by the cameras.

To further illustrate, in one example for calibrating a sensor, the computing device may enable adjusting parameters of a sensor (e.g., camera) by using some projected pattern (e.g., checkerboard) and capturing images and/or other information corresponding to the projected pattern. In addition, to determine any adjustments, the computing device may be moved in an orbit motion or otherwise suitable motion around the pattern while capturing observations of the projected or otherwise available pattern and may also be moved towards or away from the pattern. In some instances, the computing device may use a known scene rather than a pattern.

After capturing various observations of the projected, otherwise available pattern or known scene from the different viewpoints, the computing device may calculate parameters associated with sensors used to observe the pattern (e.g., cameras, IMU unit, etc.). Furthermore, based on the multiple observations from different viewpoints, the computing device may calibrate sensors capturing outputs. For example, the computing device may use the pattern process to calibrate one or multiple cameras of the device. The computing device may determine that a sensor or multiple sensors associated with the computing device have been calibrated in other ways as well. The computing device may be configured to use sensor data for calibration during periods of no motion of the computing device. For example, the computing device may determine using the IMU unit that the computing device may be motionless and use sensor readings for calibration at that point. Similarly, the computing device may determine that the computing device may be motionless during factory manufacturing, such as when a robotic arm may have control of the computing device. In such cases, the computing device may be capable of adjusting parameters of cameras without suffering from motion blur, rolling shutter or synchronization artifacts.

At block 404, the method 400 may also include receiving from the first sensor and a second sensor of the plurality of sensors outputs indicative of independent observations of a motion of the device. In such an example, the computing device may receive an output from the known calibrated sensor (e.g., a first sensor) and another output from a sensor that may require adjustments (e.g., a second sensor). The respective outputs may both be indicative of independent observations by the respective sensors based on a motion of the device. As the computing device receives the outputs, the computing device may be configured to associate each output received with its respective sensor.

In another example implementation, an example computing device may receive outputs from multiple sensors that capture some other information in addition to observing the motion of the device. The sensors providing the information to the computing device may capture the outputs during the same range of time (e.g., same couple of milliseconds or seconds, etc.).

In particular, the information captured by the respective sensors may be indicative of independent observations of motion of the device, which may enable the computing device to determine any variation between the sensors' outputs. The observations of motion of the device may be independently based on each sensor, for example.

In one such illustration, the computing device may receive outputs from an IMU unit and coordinating outputs from a camera system. Within the illustration, the computing device may have received information indicating that a camera and/or the IMU unit has been calibrated recently. In addition, the outputs received by the computing device may correspond to the same environment and/or may capture independent observations of motion of the device for the same period of time. Within the example illustration, the IMU unit may capture motion information within observations relating to the motion of the device while the camera system may capture image observations relating to the same motion of the device.

In particular, the sensors (e.g., camera and IMU unit) may capture the same motion of the device simultaneously so the outputs may be compared. Both types of sensors may capture additional information and may provide the information in a format that allows for the computing device to execute analysis and comparison techniques. In addition, other sensors associated with the computing device may capture information based on the same motion of the computing device during the same time period in a similar manner as the IMU unit and camera.

Likewise, the computing device may receive outputs indicative of independent observations of motion of the device from other types of sensors and/or in other combinations. For example, the computing device may receive outputs indicative of calibration information relating to the computing device from a RS camera and from a GS camera. Other sensors and combinations may use within other example implementations.

Furthermore, after receiving sensor outputs encompassing information corresponding to motion of the device (e.g., independent observations), the computing device may analyze the information using various techniques and/or software. For example, the computing device may receive and store the outputs within memory. The computing device may also utilize the outputs for comparisons.

In addition, the computing device may receive additional rounds of outputs from sensors based on subsequent motions of the device (e.g., a user may move the device again). Similar to the prior outputs, the different sensors may capture independent observations based on the new motion of the device and may provide the additional observations to the computing device as well. The computing device may be configured to utilize all or a subset of the observations received, for example.

In another example implementation, a robotic device and/or another system may execute the movement of the computing device, which may enable sensors to capture outputs indicative of the computing device's motion during a predefined period of time. Within the example implementation, the computing device may be configured to measure the amount of movement of the device as performed by the robotic device and/or system and use the motion information to assist with the calibration process (e.g., calibrate a sensor based on the movement of the robotic device) during a period of time.

In particular, the computing device may track its movement (e.g., the start and stop of the motion) by measuring the duration of the movement caused by the robotic device through using a NFC sensor or similar sensor. The NFC sensor may capture information determining the moment the movement starts and stops to utilize with the sensor outputs captured based on the computing device's movement. For example, the NFC sensor may determine when the computing device has been picked up by the robotic device and may also determine when the robotic device has put down the computing device (e.g., stopped moving the computing device).

In addition, in some implementations, data capture by the computing device for calibration may occur over different temperature ranges. Some parameters of the sensors or equipment of the device may be temperature dependent. Acquiring additional information relating to the temperature ranges may assist in determining parameters of the device. For example, the temperature of one or more components of the computing device may influence the adjustments that the system makes upon temperature sensors. Other examples of capturing observations of motion by the sensors of a computing device may exist as well.

At block 406, the method 400 may include determining a first estimation of the motion of the device based on the output of the first sensor and a second estimation of the motion of the device based on the output of the second sensor. In particular, a computing device performing the method 400 may determine respective estimations of the motions of the device based on the received outputs from the respective sensors. The determined estimations of motion of the device may correspond directly to the respective sensors that captured outputs based on the period of motion of the computing device. For example, the computing device may determine an estimation of motion of the device based on images captured by a camera (e.g., imaging camera) during a period of motion of the computing device. In such an example, the computing device may adjust various parameters of the camera.

Within other examples, the computing device may determine other information based on the outputs captured by the sensors. The computing device may utilize the other information for determining adjustments for sensors and/or the computing device. The determined estimations of motion of the device and/or other information may be linked directly to the respective sensors, which may enable the computing device to determine variances (e.g., differences) between the sensors.

For example, the computing device may analyze the outputs captured and provided by gyroscope to determine an estimation of motion of the device. The outputs may correspond to a specific period of time when the computing device had been moved. This enables the computing device to determine an estimation of motion based on the information captured by the gyroscope. Likewise, in the same example, the computing device may also analyze images captured by a camera of the computing device. The images may have been captured during the same period of movement as the one that the gyroscope captured information during. The computing device may use the images to develop an estimation of motion of the computing device for use to compare with the estimation of motion developed from the gyroscope outputs. In addition, the computing device may receive outputs indicative of the same motion of the computing device as captured by other sensors. Other examples for determining estimations of motion associated with sensors may exist as well.

In an example implementation, a computing device may receive calibration settings during factory calibration. For example, one or multiple cameras of a computing device may observe a calibration pattern (e.g., a checkerboard or dot layout) of known layout and dimensions. The computing device or a factory production machine may analyze images captured by the cameras to identify and precisely locate pattern features (e.g., checkerboard corners or dot centers).

In some instances, based in part on the two-dimensional image locations (in pixels) of features with known three-dimensional structures, the computing device or factory machine may be capable of determining camera pose with respect to the given analyzed pattern. In addition, other examples of pose-n-point analysis may exist as well. For example, the motion of the computing device between multiple observations may enable comparison of multiple poses.

Furthermore, the computing device or factory production machine may use outputs of the IMU of the computing device to independently estimate motions of the computing device between the capturing of images by cameras of the computing device. During the time interval of image captures, the computing device may receive multiple IMU readings. For example, the accelerometer and gyroscope may measure the translational and/or angular acceleration respectively. In some cases, the computing device may process the readings provided by the IMU readings (e.g., numerically double integrate the quantities) in order to estimate pose of the computing device (e.g., position and rotation).

In addition, the computing device may execute an online calibration process, which may not involve observing a known pattern. In such a case, the computing device may estimate motion from camera images using natural features (e.g., corners in the environment) or other features as captured in the images and shown in the local environment. The computing device may use odometry to assist in calibrating sensors.

At block 408, the method 400 may also include determining whether the second estimation of motion of the device is within a threshold variance of the first estimation of motion of the device. In particular, a computing device may compare the estimation of motion as determined by a potentially non-calibrated sensor to the estimation of motion as determined by the calibrated sensor. Based on the comparison, the computing device may be configured to compare the outputs as provided by sensors to determine if any adjustments may be necessary. For example, within the comparison, the computing device may analyze the estimations of motions as provided by the individual sensors and determine if any variations exist in between, for example.

In addition, sensors of a computing device may be calibrated during a factory manufacturing, which may involve adjusting the sensors and components of the computing device based on known parameters. For example, factory manufacturing may involve calibration techniques that may be based on known motions or adjustments of the computing device.

In examples, the computing device may be configured to use a threshold test to determine if the variations existing between the sensors require further action from the computing device (e.g., calibration). By comparing the determined estimations of motion based on a movement of the computing device as captured by the calibrated sensor to the estimation of motion as captured by the potentially non-calibrated sensor, the computing device may determine possible differences that may require the computing device to adjust one or more parameters of the non-calibrated sensor.

In one example implementation, a computing device may determine whether an estimation of motion of the device from a potentially non-calibrated sensor may be within a threshold variance of an estimation of motion of the device from a calibrated sensor based on determining a bias (e.g., offset), scale, and/or noise associated with the output of the potentially non-calibrated sensor relative to the calibrated sensor. The computing device may use the determined bias, scale, and/or noise associated with the output of the potentially non-calibrated sensor to determine whether or not to calibrate the particular sensor. The computing device may use the scale to determine a multiplier that may help adjust a sensor's outputs to match the outputs of another sensor. For example the computing device may determine a bias and/or scale correction factor, which may be utilized by the computing device to correct the non-calibrated sensor.

At block 410, the method 400 includes, based on whether the second estimation of motion of the device is within the threshold variance of the first estimation of motion of the device, providing instructions to adjust one or more parameters of the second sensor. Based on comparing the respective estimate of motions as captured within the outputs of the different sensors, a computing device may determine whether or not to calibrate a sensor based on its estimation of motion compared to the calibrated sensor's estimation of motion. In particular, the computing device may calibrate the sensor to align the sensor's outputs to match the outputs as provided by the calibrated sensor. The computing device may be configured to perform multiple comparisons to determine if any adjustments to the computing device and/or sensors may be required.

Within examples, a computing device may calibrate a sensor on varying degrees of difference between the estimations of motions as captured identified calibrated sensor and the potentially non-calibrated sensor. The computing device may be configured to adjust sensors so that the respective sensors operate with a high degree of accuracy. In addition, the computing device may require the sensors to be closely synchronized, which may require all or some of the sensors to be calibrated often. A computing device may further provide options for a user to determine the accuracy of the various sensors. For example, the computing device may provide options for a user to determine how often the computing device performs a calibration process, such as the method 400.

Furthermore, a computing device may adjust internal components and/or sensors based on geometric relationships determined between sensors on the device. For example, the computing device may calibrate the IMU with respect to one or multiple cameras of the device. Likewise, the computing device may utilize information captured from sensors to calibrate the device's internal processing components. The computing device may be configured to adjust a subset of the total amount of parameters associated with a sensor as well.

In addition, the computing device may determine differences between sensor outputs based on a coordinate system. For instance, the computing device may be configured to use a calibrated camera for calibrating other sensors. The outputs as received by the calibrated camera may represent the origin (0,0,0) of the coordinate system as developed by the computing device. Other sensors associated with the computing device may produce outputs based on the same motion of the computing device at different coordinate values. For example, another camera may capture information that is offset from the origin (0,0,0) by a few units at (0,2,0). The computing device may analyze the outputs and determine that the offset between the calibrated camera and the non-calibrated camera to determine adjustments to the parameters to align the outputs of the non-calibrated camera. Within the example, the computing device may require the offset to be greater than a threshold and/or uncertainty lower than a threshold prior to determining adjustments for the non-calibrated sensor.

In a further aspect, a computing device may be configured to calibrate multiple sensors simultaneously, which may involve using the outputs of a calibrated sensor to effectively adjust the multiple sensors to provide accurate information. For example, the computing device may compare estimation of motions of a device based on the outputs of multiple sensors, which may include one or more calibrated sensors. Depending on the variances between the estimations of motions of the inaccurate sensors with the calibrated sensor, the computing device may calibrate multiple sensors simultaneously.

In another implementation, a computing device may be configured to determine a trust factor associated with respective sensors of the multiple device sensors. For instance, the trust factor may be based on parameters of the respective sensors. Likewise, the trust factor may also be indicative of a confidence level that the respective sensors provide accurate outputs. For example, a sensor that provides accurate outputs may likely have a greater trust factor than a sensor that often provides inaccurate outputs. In such an example, the computing device may be configured to provide instructions to adjust parameters of respective sensors relative to the first sensor in an order based on the trust factor associated with respective sensors. The trust factor may be based on the typical accuracy of a type of sensor or base on other factors associated with the sensors, etc. The computing device may use the trust factor as a way to calibrate sensors in a predetermined order, for example.

Furthermore, the computing device may be configured to determine whether or not the computing device is performing a function. Based on whether or not the computing device is performing a function, the computing device may be configured to calibrate one or more sensors.

In one example implementation, the computing device may calibrate a depth camera by using a robotic arm and/or user to rotate the camera above a point depth projection on a flat or otherwise known surface. The computing device may capture multiple observations using the depth camera at multiple angles in order to get the intrinsic information about the camera. The computing device may calibrate the depth camera based on the camera intrinsic information and observations, for example.

As previously indicated, the computing device may be configured to operate as a unified system. This may require the computing device to calibrate sensors based on the outputs captured by other sensors. The computing device may calibrate sensors based on a more accurate sensor or a more expensive sensor, for example. The computing device may take observations from a combination of the sensors of a complex trajectory and estimate adjustments based on the observations.

Within implementations, the computing device may use computer vision to determine factors associated with sensor information. The computer vision may include constructing 3D graphics into useful information for calibrating sensors. For example, the computing device may receive independent rotation information from the camera of the device and from the gyroscope. The computing device may factor in the bias, drift, and/or noise of the gyroscope to estimate adjustments to the parameters of the gyroscope based on the images captured by the camera. In addition, the computing device may configure the cameras based on the motion of the device as captured by the IMU unit. Furthermore, the computing device may configure time synchronization based on sensor information corresponding to motion, for example. The computing device may determine a bias of the accelerometer, for example, at initial run-time and use the bias to determine a relationship between images captured by a camera and the information captured by the IMU unit. The computing device may estimate a spatial relationship between the IMU unit and the camera and adjust the IMU unit and/or the camera based on the spatial relationship.

In addition, the computing device may use the screen to display information using the cameras to assist with calibrating sensors. The computing device may provide sensor outputs to the user by displaying information on the screen and enable adjustments to be made based on user inputs.

Furthermore, the computing device may be configured to determine adjustments of one or multiple sensors based on parameter values determined during factory manufacturing of the computing device. In some instances, the factory manufacturing process of the computing device may enable the computing device to determine ideal operating ranges for sensors of the computing device, for example. The computing device may use the factory manufacturing settings as pre-stored calibration values that may assist in keep the sensors the computing device operating properly.

In addition, in some example implementations, the computing device may be configured to determine adjustments for a sensor based on the outputs of one or more other sensors of the computing device. For example, the computing device may use the outputs of two sensors to assist in calibrating a third sensor of the computing device.

In another example implementation, a computing device may adjust or calibrate one or multiple sensors of the computing device prior to receiving an indication that a sensor of the computing device has been calibrated. For example, the computing device may adjust multiple sensors based on the outputs of the sensors, which may involve using the combination of the outputs to determine the adjustments that should be made. Likewise, the computing device may adjust the sensors based on predefined parameters of the sensors, which may be determined during factory manufacturing/calibration or based on the structure or functions of the sensors, for example. The computing device may adjust the sensors without adjusting the sensors based on a recently calibrated sensor.

FIG. 5 is a conceptual illustration of an example computing device calibrating sensors. In the conceptual illustration, the example computing device 500 may perform a process or technique, such as the method 400, which relates to calibrating a sensor or multiple sensors of the computing device 500. In order to calibrate one or multiple sensors associated with the computing device 500, the computing device 500 may execute a calibration process that could involve obtaining multiple observations of an example checkerboard pattern 502 from different positions and/or orientations by a sensor or multiple sensors and making adjustments to the sensor(s) based on the multiple observations.

In particular, within the conceptual illustration, the computing device 500 may be moved by a source, such as the user 504, to capture various observations of the checkerboard pattern 502 from different angles, positions, and/or orientations relative to the checkerboard pattern 502. In some instances, the computing device 500 may be configured to remain stationary while capturing observations corresponding to the checkerboard pattern 502 in order to calibrate a sensor, for example.

Furthermore, the conceptual illustration shows that the computing device 500 may provide graphical and/or textual information to the user 504 via a screen on the computing device 500. Within the example, the arrow 506 represents the screen displaying information for the user 504 to receive.

In other examples, the computing device may display the observations via other forms of user interface capable of providing information to a user, such as audio signals. In other examples, the computing device 500 may be configured to calibrate sensors without providing analysis information to the user 504.

Furthermore, the conceptual illustration in FIG. 5 shows that the computing device may include multiple cameras, such as the cameras 508-510. Particularly, the computing device may have an imaging camera 508, which may capture images based on a narrow field of view of the environment. In addition, the computing device 500 may also include a machine vision camera 510, which may capture images based on a wider field of view than the field of view of the image camera. Likewise, the computing device may also include a structured light source, which may help capture observations of the environment (e.g., depth data) through providing various formats of light.

In the example shown in FIG. 5, the computing device 500 may capture observations of the checkerboard pattern 502 using the imaging camera 508 and/or the machine vision camera 510, as indicated by the observation lines 512. FIG. 5 shows observation lines 512 for illustration purposes.

As previously indicated, the computing device 500 may capture multiple observations of the checkerboard pattern 502 from different angles, positions, and/or orientations relative to checkerboard pattern 502 using a sensor (e.g., imaging camera 508). The computing device 500 may receive the multiple observations and perform an adjustment analysis using the observations as one way to determine if the imaging camera 508 requires any adjustments to improve its accuracy. Capturing multiple observations to provide to the computing device 500, the computing device 500 may perform analysis techniques to determine any adjustments a sensor may need. The computing device 500 may perform computer vision processes to determine any adjustments that may be needed for the imaging camera 508. In other examples, the computing device 500 may calibrate other sensors using a similar process. For example, the computing device 500 may calibrate the machine vision camera 510, other types of cameras, and/or other types of sensors associated with the computing device 500.

In a further aspect, the computing device 500 may include additional sensors for capturing information relative to the motion of the device and/or observations of the checkerboard pattern 502. For example, the computing device may include an IMU unit configured to capture the motion of the computing device, which may be captured while cameras of the computing device capture observations of the checkerboard pattern 502. The IMU unit may include a gyroscope, accelerometer, a pedometer, and/or other combinations of sensors. In addition, the computing device 500 may capture location information from a GPS receiver associated with the computing device 500.

In another example, the sensors (e.g., cameras) of the computing device 500 may capture observations and/or information based on a different object and/or pattern. For example, the computing device may project a pattern using some light source, etc., for use. Furthermore, the computing device may calibrate other sensors based on a calibrated sensor after calibrating the sensor using the projection process as discussed within FIG. 5.

In addition, within the example, the computing device 500 may use the checkerboard pattern 502 and/or another high contrast static pattern to capture multiple observations via a camera of the computing device. The computing device 500 may use the multiple observations to determine adjustments for another camera of the computing device 500 as well. The computing device 500 may further use information received from a gyroscope and/or accelerometer to determine a pose of the computing device 500 and determine if the information captured from the gyroscope and/or accelerometer are producing accurate outputs based on the multiple observations captured by the camera.

FIG. 6 is another conceptual illustration of an example computing device calibrating sensors. In the conceptual illustration shown in FIG. 6, the computing device 600 may execute a change in position and/or orientation as represented by arrow 602. For example, a user may manually move the computing device 600 in any desired motion during which, sensors associated with the computing device 600 may capture observations of the environment during the movement. For example, a computing device 600 may include a camera system configured to capture images and may also include an IMU unit configure capture motion information based on the movement of the computing device 600.

In the example in FIG. 6, the computing device 600 may move between the two positions shown. As previously discussed, the computing device 600 may be moved by a user, a robotic device, and/or some other way. The arrow 602 represents the movement of the computing device 600 within the conceptual illustration. Although the arrow 602 exists as a straight line, the computing device 600 may move in random movements (e.g., circles, waves) while sensors capture information to provide to the processors and/or other components of the computing device 600.

While the computing device 600 changes position and/or orientation within the environment, device sensors may capture and provide information to the computing device that may be utilized for adjusting sensor(s). In particular, the different outputs provided by the sensors may include independent observations of the movement of the computing device 600 based on the device's movement. Initially, device sensors may capture information at a first field of view 604 within the environment and may continue to capture information based on changing field of views of the environment as a result of the changing position and orientation of the computing device 600. Within the example, when the computing device 600 stops moving, the sensors may continue to capture information at the new stationary second field of view 606 of the environment.

Different types of sensors may capture a variety of information while the computing device 600 changes position. For example, the cameras of the computing device 600 may capture images based on the different fields of view while components of the device's IMU unit capture motion information. The computing device 600 may process the information using a technique that links the motion information to the images captured.

In addition, the computing device 600 may receive the respective observations from the different sensors and analyze the information to determine which sensors may require adjustments. In particular, the computing device 600 may compare the information based on the computing device's motion as captured by respective sensors to the motion information captured by a calibrated sensor to determine if any variance exists between the sensors. By determining if sensors require adjustments based on the outputs provided by a calibrated sensor, the computing device 600 may calibrate all or a subset of its sensors.

The conceptual illustration shown in FIG. 6 further includes a graph 608 that illustrates the outputs received by the computing device 600 from different sensors. In particular, the graph 608 provides information relating to the sensor outputs captured by three different sensors based on the computing device's motion. Within the graph 608, each output line represents the outputs captured by a respective sensor. For example, output line 610 may correspond to information captured by a camera, a gyroscope, or other type of sensor, etc. In addition, the output lines 610, 612, and 614 may represent information provided by different types of sensors and/or the same types, for example.

Furthermore, the graph 608 serves as one example implementation and may display information differently within other examples. For example, the graph 608 may display velocity, position, acceleration, and/or other types of information that may be captured by the various sensors, etc. Within other examples, the graph 608 may include additional line outputs corresponding to other sensors and/or may include more or less information overall.

Within the example graph 608 shown in FIG. 6, the output line 610 positioned at the top of the graph may represent the output of a calibrated sensor (e.g., a calibrated imaging camera) for example purposes. As shown within the graph, the output line 610 captured from a calibrated sensor may reflect observations captured by the calibrated sensor during the period movement of the computing device 600 also represented within FIG. 6. The wave-like pattern represented by the output line 610 may indicate that the computing device 600 may have changed position and orientation in random movements (e.g., in circles and other shapes) from the initial position to the final position. In addition, the calibrated sensor of the computing device 600 may capture different movement patterns (e.g., straight line) of the computing device 600 as well within other examples.

Furthermore, the graph 608 includes additional output lines 612-614 that may correspond to information captured by other sensors during the same period of movement of the computing device 600. In the example shown by the graph 608, the other sensors may require some form of calibration since the output lines 612-614 vary from the output line 610 as provided by a designated calibrated sensor. For example, as a result of receiving information shown within the graph 608, the computing device 600 may determine that parameter(s) associated with the other sensors that provided output lines 612-614 may require adjustments to provide outputs similar to output line 610.

As indicated, the computing device 600 may adjust parameters of non-calibrated sensors based on outputs provided by a calibrated sensor. For example, the computing device 600 may determine offsets between the outputs provided by potentially non-calibrated sensors compared to the outputs provided by a calibrated sensor. In particular the computing device 600 may determine that an offset 616 exists between the output line 612 captured by a non-calibrated sensor and the output line 610 captured by a calibrated. Based on the determined offset 616 and/or other variance between the sensors' outputs, the computing device may adjust the non-calibrated sensor. Likewise, the computing device may determine another offset 618 exists between the output line 614 captured by another sensor compared to the output line 610 captured by the calibrated sensor (e.g., calibrated camera). The computing device may make adjustments to the other sensor based on the offset 618 as well.

In addition, the computing device 600 may use the information within the graph to determine other differences/variance between the information captured by the different sensors. For example, the computing device 600 may determine differences due to noise or differences between sensors based on scale. The computing device 600 may determine that a sensor may not require adjustments as a result of identifying minor variances that exist due to captured noise. Other examples may exist as well.

In another example implementation, a computing device may calibrate a camera or multiple cameras. In particular, the example computing device may determine that one or multiples cameras that may require calibration, such as rear-facing cameras positioned on the back of the computing device.

Within the example implementation, one or multiple of the cameras associated with the computing device may include a moveable lens, which may require specific adjustments. As previously indicated, the computing device may execute the method 400 or a similar process to determine possible adjustments for each of the cameras within the camera system. For example, the computing device may calibrate a rear facing camera initial using the checkerboard pattern process or a similar technique, Once the computing device has at least one sensor (e.g., a rear facing camera) calibrated, the computing device may proceed to determine adjustments for other sensors using the information provided by the calibrated sensor as a standard.

In another instance, the computing device may calibrate one or both of the rear facing cameras based on an already calibrated sensor. For example, the computing device may use a calibrated gyroscope to serve as a base for calibrating its cameras. The computing device may use a comparison or multiple comparisons to determine if a rear camera produces results that vary within a threshold from the outputs provided by a calibrated sensor. The threshold may be used to limit the computing device from adjusting sensors based on very minor variances, which may result from noise or other minor differences, etc.

In a further aspect, the computing device may provide instructions to adjust a position, a depth, and/or an orientation of the moveable lens associated with a rear camera. In addition, the computing device may calibrate other parameters of the rear camera(s) as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

The invention claimed is:

1. A method performed by a device having a plurality of sensors, the method comprising:

receiving information indicating that a first sensor of the plurality of sensors has been calibrated;

receiving from the first sensor and a second sensor of the plurality of sensors outputs indicative of independent observations of a motion of the device;

determining a first estimation of the motion of the device based on the output of the first sensor and a second estimation of the motion of the device based on the output of the second sensor;

determining whether the second estimation of motion of the device is within a threshold variance of the first estimation of motion of the device; and based on whether the second estimation of motion of the device is within the threshold variance of the first estimation of motion of the device, providing instructions to adjust one or more parameters of the second sensor.

2. The method of claim 1, further comprising:

receiving from a third sensor of the plurality of sensors outputs indicative of independent observations of a motion of the device substantially simultaneous to receiving from the first sensor and the second sensor of the plurality of sensors outputs indicative of independent observations of the motion of the device;

determining a third estimation of motion of the device based on the output of the third sensor;

determining whether the third estimation of motion of the device is within a threshold variance of the first estimation of motion of the device and the second estimation of motion of the device; and based on whether the third estimation of motion of the device is within the threshold variance of the first estimation of motion of the device and the second estimation of motion of the device, providing instructions to adjust one or more parameters of the second sensor.

3. The method of claim 1, wherein the motion of the device is performed by a robotic device, and the method further comprises:

receiving information indicative of the motion of the device from the robotic device; and determining whether the second estimation of motion of the device is within a threshold variance of the motion of the device as indicated within the information from the robotic device; and based on whether the second estimation of motion of the device is within a threshold variance of the motion of the device as indicated within the information from the robotic device, providing instructions to adjust one or more parameters of the second sensor.

4. The method of claim 1, wherein receiving information indicative of the motion of the device from the robotic device comprises:

determining the motion of the device from the robotic device based on a near-field communication sensor of the device.

5. The method of claim 1, further comprising:

determining whether the device is performing a function; and wherein providing instructions to adjust one or more parameters of the second sensor is based on whether the device is performing the function.

6. The method of claim 1, further comprising:

determining a trust factor associated with respective sensors of the plurality of sensors, wherein the trust factor is based on one or more parameters of the respective sensors and is indicative of a confidence level that the respective sensors provide accurate outputs; and providing instructions to adjust one or more parameters of respective sensors relative to the first sensor in an order based on the trust factor associated with respective sensors.

7. The method of claim 1, wherein the plurality of sensors include one or more of a gyroscope, accelerometer, camera, barometer, magnetometer, global positioning system (GPS), Wi-Fi sensor, near-field communication (NFC) sensor, temperature sensor, and Bluetooth sensor.

8. The method of claim 1, wherein the first sensor is a camera and the second sensor is one or more of a gyroscope, accelerometer, temperature sensor, and magnetometer.

9. The method of claim 1, wherein receiving information indicating that a first sensor of the plurality of sensors has been calibrated comprises:

receiving information indicating that the first sensor has been calibrated via a pattern-process, wherein the pattern-process includes calibrating the first sensor using multiple observations by the first sensor of a static pattern and calibrating the first sensor based on the multiple observations.

10. The method of claim 1, wherein the second sensor is a camera with a moveable lens; and wherein providing instructions to adjust one or more parameters of the second sensor comprises:

providing instructions to adjust one or more of a position, a depth, and an orientation of the moveable lens.

11. The method of claim 1, wherein determining whether the second estimation of motion of the device is within a threshold variance of the first estimation of motion of the device comprises:

determining one or more of a bias, a scale, and a noise associated with an output of the second sensor; and wherein providing instructions to adjust one or more parameters of the second sensor comprises:

providing instructions to adjust the one or more parameters of the second sensor based on the one or more of the bias, the scale, and the noise associated with the output of the second sensor.

12. The method of claim 1, further comprising:

based on one or more parameters associated with the first sensor, providing instructions to adjust one or more parameters of a plurality of sensors simultaneously.

13. A non-transitory computer readable medium having stored thereon instructions that, upon execution by a computing device, cause the computing device to perform functions comprising:

receiving information indicating that a first sensor of a plurality of sensors has been calibrated;

receiving from the first sensor and a second sensor of the plurality of sensors outputs indicative of independent observations of a motion of the computing device;

determining a first estimation of the motion of the computing device based on the output of the first sensor and a second estimation of the motion of the computing device based on the output of the second sensor;

determining whether the second estimation of motion of the computing device is within a threshold variance of the first estimation of motion of the computing device; and based on whether the second estimation of motion of the computing device is within the threshold variance of the first estimation of motion of the computing device, providing instructions to adjust one or more parameters of the second sensor.

14. The non-transitory computer readable medium of claim 13, wherein the motion of the computing device is performed by a robotic device, and the functions further comprise:

receiving information indicative of the motion of the computing device from the robotic device; and determining whether the second estimation of motion of the computing device is within a threshold variance of the motion of the computing device as indicated within the information from the robotic device; and based on whether the second estimation of motion of the computing device is within a threshold variance of the motion of the computing device as indicated within the information from the robotic device, providing instructions to adjust one or more parameters of the second sensor.

15. The non-transitory computer readable medium of claim 13, wherein receiving information indicative of the motion of the computing device from the robotic device comprises:

determining the motion of the computing device from the robotic device based on a near-field communication sensor of the computing device.

16. The non-transitory computer readable medium of claim 13, wherein the functions further comprise:

adjusting a plurality of sensors based on one or more of a plurality of outputs received from the plurality of sensors and a plurality of predefined parameters of the plurality of sensors prior to receiving information indicating that a first sensor of the plurality of sensors has been calibrated.

17. A system comprising:

at least one processor; and a memory having stored thereon instructions that, upon execution by the at least one processor, cause the system to perform functions comprising:

receiving information indicating that a first sensor of a plurality of sensors of a computing device has been calibrated;

receiving from the first sensor and a second sensor of the plurality of sensors outputs indicative of independent observations of a motion of the computing device;

determining a first estimation of the motion of the computing device based on the output of the first sensor and a second estimation of the motion of the computing device based on the output of the second sensor;

determining whether the second estimation of motion of the computing device is within a threshold variance of the first estimation of motion of the computing device; and based on whether the second estimation of motion of the computing device is within the threshold variance of the first estimation of motion of the computing device, providing instructions to adjust one or more parameters of the second sensor.

18. The system of claim 17, wherein the functions further comprise:

providing instructions to adjust one or more parameters of a third sensor based on one or more outputs of the first sensor and one or more outputs of the second sensor.

19. The system of claim 17, wherein the functions further comprise:

providing instructions to adjust one or more parameters of the second sensor based also on a plurality of parameter values determined during factory manufacturing.

20. The system of claim 17, wherein the second sensor is a camera with a moveable lens; and
wherein providing instructions to adjust one or more parameters of the second sensor comprises:
providing instructions to adjust one or more of a position, a depth, and an orientation of the moveable lens.

* * * * *